(12) United States Patent
Kimura

(10) Patent No.: US 9,883,064 B2
(45) Date of Patent: Jan. 30, 2018

(54) IMAGE READER AND IMAGE FORMING APPARATUS DETERMINING DIRECTION OF DOCUMENT TO BE READ

(71) Applicant: KYOCERA Document Solutions Inc., Osaka (JP)

(72) Inventor: Shinichi Kimura, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/363,272

(22) Filed: Nov. 29, 2016

(65) Prior Publication Data

US 2017/0163828 A1 Jun. 8, 2017

(30) Foreign Application Priority Data

Dec. 8, 2015 (JP) ................................. 2015-239556

(51) Int. Cl.
*G06K 15/00* (2006.01)
*H04N 1/00* (2006.01)
(Continued)

(52) U.S. Cl.
CPC ..... *H04N 1/00721* (2013.01); *G06K 9/00463* (2013.01); *G06K 9/3283* (2013.01);
(Continued)

(58) Field of Classification Search
USPC ................ 358/462–464, 1.1–3.29, 1.11–1.18
See application file for complete search history.

(56) References Cited

U.S. PATENT DOCUMENTS

| 6,546,215 B2 | 4/2003 | Machida |
| 6,798,895 B1 * | 9/2004 | Takahashi ............ G06K 9/2054 382/101 |

(Continued)

FOREIGN PATENT DOCUMENTS

| JP | H06-103410 A | 4/1994 |
| JP | H06-225053 A | 8/1994 |

(Continued)

*Primary Examiner* — Marcellus Augustin
(74) *Attorney, Agent, or Firm* — IP Business Solutions, LLC

(57) ABSTRACT

An image forming apparatus includes: a document reading section; a character detection section detecting, based on image data of a document obtained through reading by the document reading section, characters included in an image formed on the document; a character concentration detection section detecting concentration of the characters detected by the character detection section; a character direction detection section detecting a direction of the characters whose concentration detected by the character concentration detection section is in a preset specified concentration range; and a document direction determination section determining, based on the direction of the characters detected by the character direction detection section, a direction of the image formed on the document as a document direction, wherein the character direction detection section, upon determination that the image on the document is a monochromatic image, defines, as the specified concentration range, a concentration range higher than predefined first concentration.

6 Claims, 6 Drawing Sheets

(51) Int. Cl.
  *G06K 9/00* (2006.01)
  *G06K 9/32* (2006.01)
  *H04N 1/387* (2006.01)

(52) U.S. Cl.
  CPC ..... *H04N 1/00726* (2013.01); *H04N 1/00737* (2013.01); *H04N 1/3877* (2013.01); *G06K 2209/01* (2013.01); *H04N 2201/0094* (2013.01)

(56) References Cited

U.S. PATENT DOCUMENTS

| | | | | |
|---|---|---|---|---|
| 2003/0049062 | A1 | 3/2003 | Machida | |
| 2008/0266611 | A1* | 10/2008 | Nishioka | H04N 1/56 358/464 |
| 2012/0236368 | A1* | 9/2012 | Uchida | G06K 9/00442 358/3.28 |
| 2014/0168730 | A1* | 6/2014 | Nakamura | H04N 1/047 358/498 |
| 2016/0381248 | A1* | 12/2016 | Matsuo | H04N 1/4078 358/1.9 |

FOREIGN PATENT DOCUMENTS

| | | |
|---|---|---|
| JP | H11-120321 A | 4/1999 |
| JP | 2000-231601 A | 8/2000 |
| JP | 2003-110829 A | 4/2003 |

\* cited by examiner

IN CASE OF MONOCHROMATIC IMAGE

IN CASE OF COLOR IMAGE

IMAGE READER AND IMAGE FORMING APPARATUS DETERMINING DIRECTION OF DOCUMENT TO BE READ

INCORPORATION BY REFERENCE

This application claims priority to Japanese Patent Application No. 2015-239556 filed on Dec. 8, 2015, the entire contents of which are incorporated by reference herein.

BACKGROUND

This disclosure relates to an image reader and an image forming apparatus, and more specifically to a technology in which a direction of a document is determined.

Some of recent multifunction peripherals combining a plurality of functions such as a copy function, a printer function, a scanner function, and a facsimile function have an automatic document direction detection function of detecting a direction of a document upon scanning.

Suggested is, for example, a technology in which, upon reading of a plurality of documents in a bundle, a direction of each document is automatically determined and, based on results of the determination, rotation processing is performed on image data of each document when necessary to thereby align the directions of document image data. Further suggested is a technology in which, when a direction of a document cannot be determined on one surface, the direction of the document is determined on another surface. Moreover, another technology is suggested in which, upon reading of a plurality of documents in a bundle, only a direction of the first document (1-page document) is determined and, based on results of the determination, the same rotation processing as that performed on image data of the first document is performed on the second document and beyond to thereby align directions of the documents.

Then also known is a technology in which a direction of characters included in a document image is detected by using a character recognition (typically called OCR) function and a direction of the document is detected based on the detected direction of the characters.

Also suggested is a technology in which image concentration distribution is obtained through a character recognition function, based on the concentration distribution, a concentration distribution region of characters is converted into black and other regions are converted into white to thereby narrow down a target of character recognition to the characters whose image is formed in black and thereby more improve accuracy in the character recognition. With this technology, when subjected to reading, concentration of a dropout color image in particular turns low and thus this image is converted into white and excluded from the target of character recognition. Moreover, upon detection of, for example, a ruled line, processing of excluding the ruled line from the target of character recognition is performed, thus improving the accuracy in the character recognition also in this regard.

SUMMARY

As one aspect of this disclosure, a technology obtained by further improving the technology described above will suggested.

An image reader according to one aspect of this disclosure includes a document reading section, a character detection section, a character concentration detection section, a character direction detection section, and a document direction determination section.

The document reading section reads a document.

The character detection section detects, based on image data of the document obtained through the reading by the document reading section, characters included in an image formed on the document.

The character concentration detection section detects concentration of the characters detected by the character detection section.

The character direction detection section detects a direction of the characters whose concentration detected by the character concentration detection section is in a preset specified concentration range.

The document direction determination section determines, based on the direction of the characters detected by the character direction detection section, a direction of the image formed on the document as a document direction.

Further, the character direction detection section determines, based on the concentration of the characters detected by the character concentration detection section, whether the image on the document is a monochromatic image or a color image, and upon determination that the image on the document is a monochromatic image, the character direction detection section defines, as the specified concentration range, a concentration range higher than predefined first concentration.

An image forming apparatus according to one aspect of this disclosure includes the image reader described above, and an image formation section forming an image on a recording medium.

DETAILED DESCRIPTION

Figure 1:
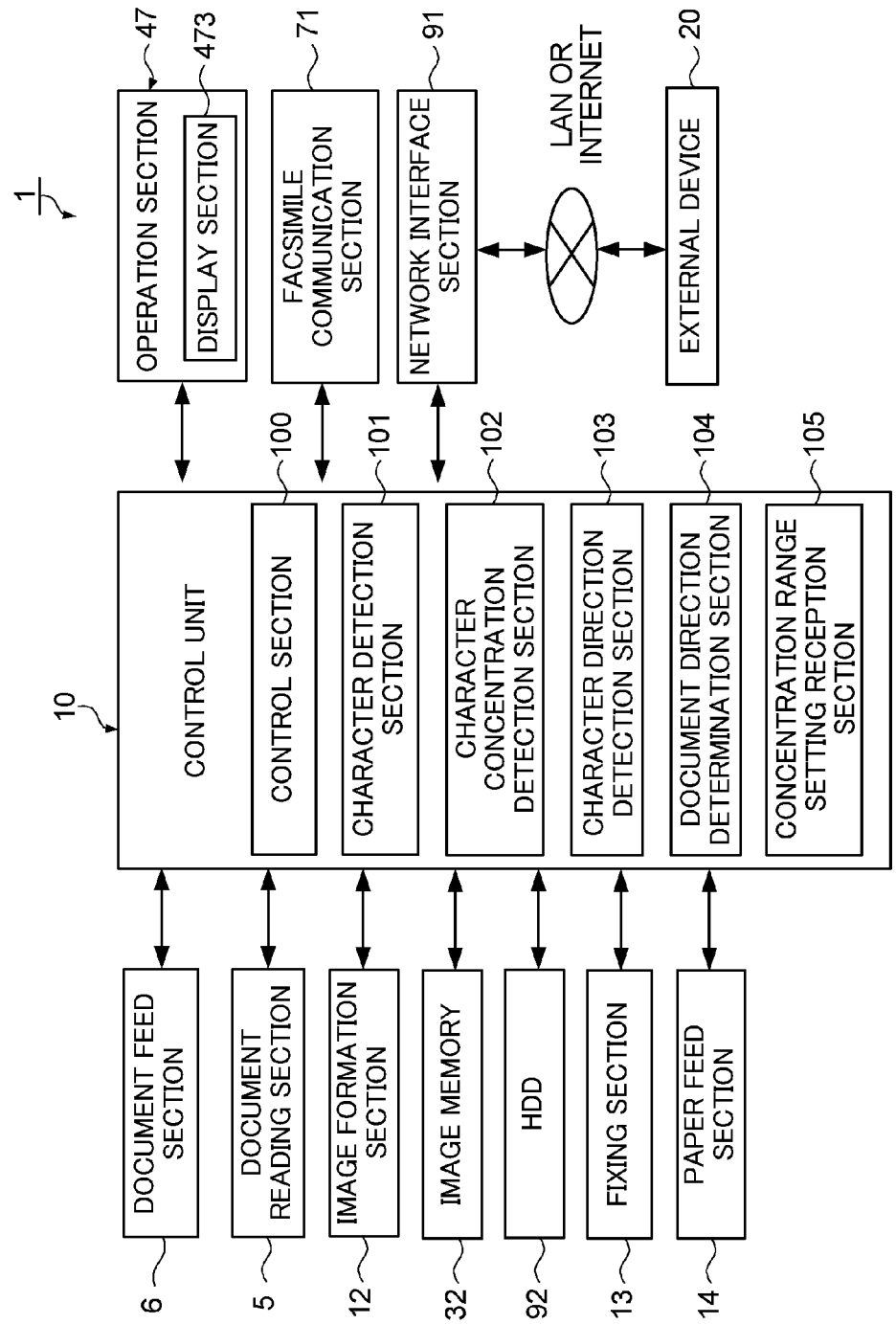
FIG. 1 is a functional block diagram schematically showing a main inner configuration of an image forming apparatus as an image reader according to one embodiment of this disclosure.

Hereinafter, an image reader and an image forming apparatus according to one embodiment of this disclosure will be described with reference to the drawings. FIG. 1 is a functional block diagram schematically showing a main inner configuration of the image forming apparatus as the image reader according to one embodiment of this disclosure. An image forming apparatus 1 is a multifunction peripheral combining a plurality of functions such as, for example, a copy function, a printer function, a scanner function, and a facsimile function. The image forming apparatus 1 includes a control unit 10, a document feed section 6, a document reading section 5, an image formation section 12, an image memory 32, a hard disk drive (HDD) 92, a fixing section 13, a paper feed section 14, an operation section 47, a facsimile communication section 71, and a network interface section 91.

The document feed section 6 feeds a document to be read to the document reading section 5.

The document reading section 5 includes, under control by a control section 100 included in the control unit 10, a reading mechanism (not shown) having a light irradiation section, a charge coupled device (CCD) sensor, etc. The document reading section 5 irradiates a document by using the light irradiation section and makes reflection light thereof be received by the CCD sensor to thereby read an image from the document.

The image formation section 12 forms, on paper (a recording medium), a toner image of an image to be printed.

The image memory 32 is a region for temporarily storing image data of the document obtained through the reading by the document reading section 5 and temporarily saving data to be printed at the image formation section 12.

The HDD 92 is a large-capacity storage device that stores, for example, the document image read by the document reading section 5.

The fixing section 13 fixes, onto the paper, the toner image on the paper through thermal compression.

The paper feed section 14 includes a paper feed cassette (not shown), and picks up and conveys paper stored in the paper feed cassette (not shown).

The operation section 47 receives, from an operator for various types of operation and various types of processing executable by the image forming apparatus 1, instructions such as an image formation operation execution instruction and a document reading operation execution instruction. The operation section 47 includes a display section 473 that displays, for example, an operation guide to the operator. The display section 473 is formed into a touch panel, which permits the operator to touch buttons and keys displayed on a screen to operate the image forming apparatus 1.

The facsimile communication section 71 includes an encoding and compounding section, a modulation and demodulation section, a network control unit (NCU), etc. all not shown, and performs facsimile communication using a public phone network.

The network interface section 91 includes a communication module such as a local area network (LAN) board, and performs transmission and reception of various pieces of data to and from an external device 20 such as a personal computer (PC) in a local area or on the Internet via, for example, the LAN connected to the network interface section 91.

The control unit 10 includes a central processing unit (CPU), a random access memory (RAM), a read only memory (ROM), and a dedicated hardware circuit. The control unit 10 includes a control section 100, a character detection section 101, a character concentration detection section 102, a character direction detection section 103, a document direction determination section 104, and a concentration range setting reception section 105.

The control unit 10, through operation based on control programs installed in the HDD 92, functions as the control section 100, the character detection section 101, the character concentration detection section 102, the character direction detection section 103, the document direction determination section 104, and the concentration range setting reception section 105. However, each of the above-mentioned control section 100 and other sections can be formed of a hardware circuit without depending on the operation performed by the control unit 10 in accordance with the control programs. Hereinafter, the same applies to this embodiment unless otherwise specified.

The control section 100 is in charge of overall operation control of the image forming apparatus 1. The control section 100 is connected to the document feed section 6, the document reading section 5, the image formation section 12, the image memory 32, the HDD 92, the fixing section 13, the paper feed section 14, the operation section 47, the facsimile communication section 71, and the network interface section 91 to perform driving control of these sections.

Based on the image data of the document obtained through the reading by the document reading section 5, the character detection section 101 detects characters included in the image formed on the document. The character detection section 101 detects characters included in the image obtained through the reading by the document reading section 5, for example, by way of an OCR function through checking by, for example, pattern matching between various portions of an image indicating printed characters (so-called type) formed by the image forming apparatus 1 by using a known font and various portions of the image obtained through the reading by the document reading section 5.

The character concentration detection section 102 detects concentration of the characters detected by the character detection section 101. For example, by detecting image data included in the image data of the document obtained through the reading by the document reading section 5 and located in a portion corresponding to the characters detected by the character detection section 101, the character concentration detection section 102 detects the concentration of the characters detected by the character detection section 101.

The character direction detection section 103 detects a direction of the characters detected by the character detection section 101. For example, the character direction detection section 103 detects the direction of the characters whose concentration detected by the character concentration detection section 102 is in a preset specified concentration range.

The document direction determination section 104, based on the direction of the characters detected by the character direction detection section 103, determines a direction of the image formed on the document (hereinafter referred to as a document image). In this embodiment, the document direction determination section 104 determines, as a direction of the document, the direction of the document image determined in the manner described above. For example, upon determination that the direction of the characters detected by the character direction detection section 103 is longitudinal, the document direction determination section 104 determines that the direction of the document is also longitudinal.

Note that the character direction detection section 103 can also use, as the specified concentration range, values set by the operator. The concentration range setting reception section 105 receives the setting of the values as the specified concentration range in accordance with operation of the operation section 47 by the operator. In this case, the character direction detection section 103 uses the received values as the specified concentration range.

Figure 2:
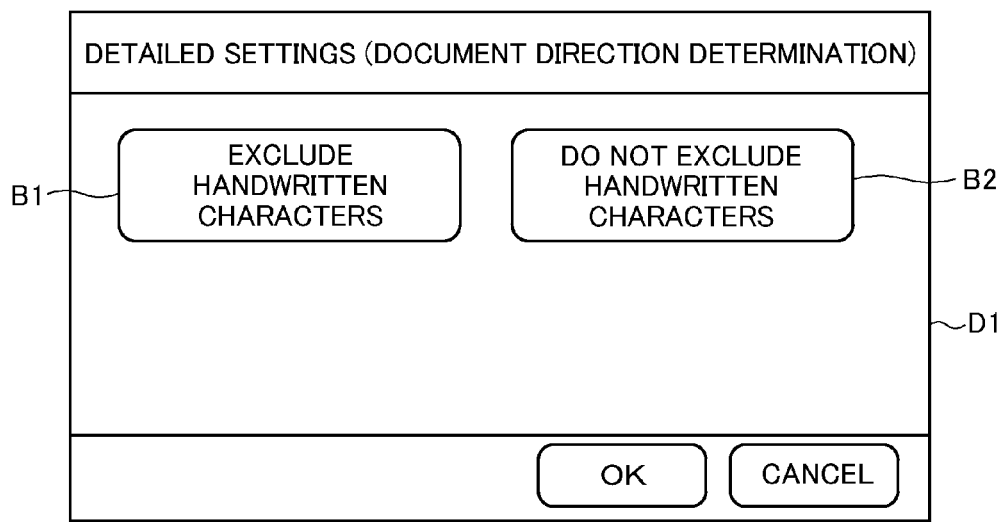
FIG. 2 is a diagram showing one example of an operation screen displayed at a display section.

For example, upon request provided from the operator for detailed settings related to the document direction determination as a result of operation of the operation section 47, the character direction detection section 103 displays, at the display section 473, a detailed setting screen D1 having selection buttons B1 and B2 as shown in FIG. 2. Based on touch operation performed by the operator on the display screen of the display section 473 displaying the detailed setting screen D1, the character direction detection section 103 receives various instructions from the operator through a touch panel function provided to the display section 473.

The selection buttons B1 and B2 are buttons for receiving, from the operator, an instruction on whether or not to determine the direction of the document image while including a direction of handwritten characters.

Upon operator's operation of the selection button B1 indicating that handwritten characters will be excluded, the character direction detection section 103 detects a direction of only the characters which are included in those detected by the character detection section 101 and whose concentration detected by the character concentration detection section 102 is in the specified concentration range described above. Upon operator's operation of the selection button B2 indicating that handwritten characters will not be excluded, the character direction detection section 103 detects a direction of all the characters detected by the character detection section 101 regardless of the concentration thereof detected by the character concentration detection section 102.

When the operation button B2 has been operated by the operator, the character direction detection section 103 uses, as the specified concentration range, values predefined as concentration (concentration higher than that of handwritten characters) used for printed characters formed in a known font.

The instruction which is on whether or not to perform the determination including the direction of handwritten characters and which is based on the operation of either of the selection buttons B1 and B2 by the operator is inputted before the instruction for document reading by the document reading section 5 is inputted through operation of the operation section 47 by the operator, and is received by the character direction detection section 103.

Based on the concentration of the characters detected by the character concentration detection section 102, the character direction detection section 103 determines whether the image of the document obtained through the reading by the document reading section 5 is a monochromatic image or a color image. Upon determination that the image of the document is a monochromatic image, the character direction detection section 103 uses, as the specified concentration range, a concentration range higher than predefined first concentration. Note that, however, for the concentration range higher than the first concentration, the operator may be permitted to set values, as described above.

Figure 3A:
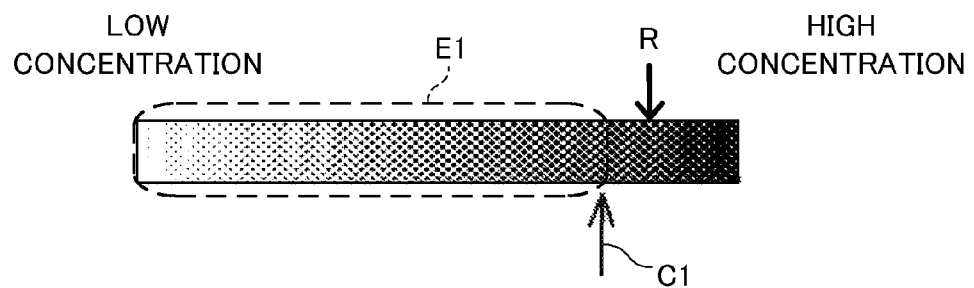
FIGS. 3A and 3B are explanatory diagrams illustrating concentration ranges used in character direction detection, with 3A referring to a case of a monochromatic image and 3B referring to a case of a color image.

When the image of the document is a monochromatic image, the character direction detection section 103 sets, as a specified concentration ranger R, a portion (other than a region E1) having concentration higher than a predefined concentration C1, like a concentration image shown in FIG. 3A. Such settings are made, because handwritten characters written in, for example, a pencil or an ink of a pen have low concentration and are frequently included in the concentration indicated by the region E1 and the aforementioned printed characters have concentration indicated by a region other than the region E1 in many cases. Thus, setting the portion having higher concentration than the predefined concentration C1 as the specified concentration range R makes it possible to exclude the handwritten characters from characters targeted for direction detection performed by the character direction detection section 103.

Upon determination based on the concentration of the characters detected by the character concentration detection section 102 that the image of the document is a color image, the character direction detection section 103 defines, as the specified concentration range described above, a concentration range higher than predefined second concentration and a concentration range between third concentration lower than the second concentration and fourth concentration lower than the third concentration. Note that, however, for the concentration range, the operator may be permitted to set values, as described above.

Figure 3B:
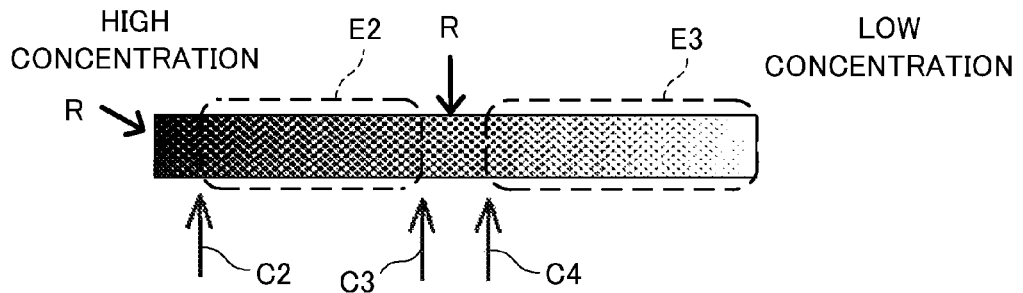

As a concentration image in FIG. 3B shows, when the image of the document is a color image, the character direction detection section 103 uses, as the specified concentration range R: a portion darker than a predefined second concentration C2; a portion lighter than a third concentration C3 (<second concentration C3); and a portion darker than a fourth concentration C4 (<third concentration C3). That is, the portions other than regions E2 and E3 are set as the specified concentration range R. The reason for the above is as follows. For example, characters written in a relatively new red ballpoint pen may be light and blurred red with concentration indicated by the region E3 and characters written in an old red ballpoint pen may turn into a color close to reddish brown with concentration indicated by the region E2. Thus, setting the portion darker than the predefined concentration C1 as the specified concentration range R and setting the concentration range lighter than the third concentration C3 and darker than the fourth concentration as the specified concentration range R makes it possible to exclude handwritten characters from characters targeted for the direction detection performed by the character direction detection section 103.

The image reader according to one embodiment of this disclosure may include, at least the document reading section 5, the character detection section 101, the character concentration detection section 102, and the character direction detection section 103. The image reader according to one embodiment of this disclosure may include, in addition to the sections described above, a concentration range setting reception section 105.

Figure 4:
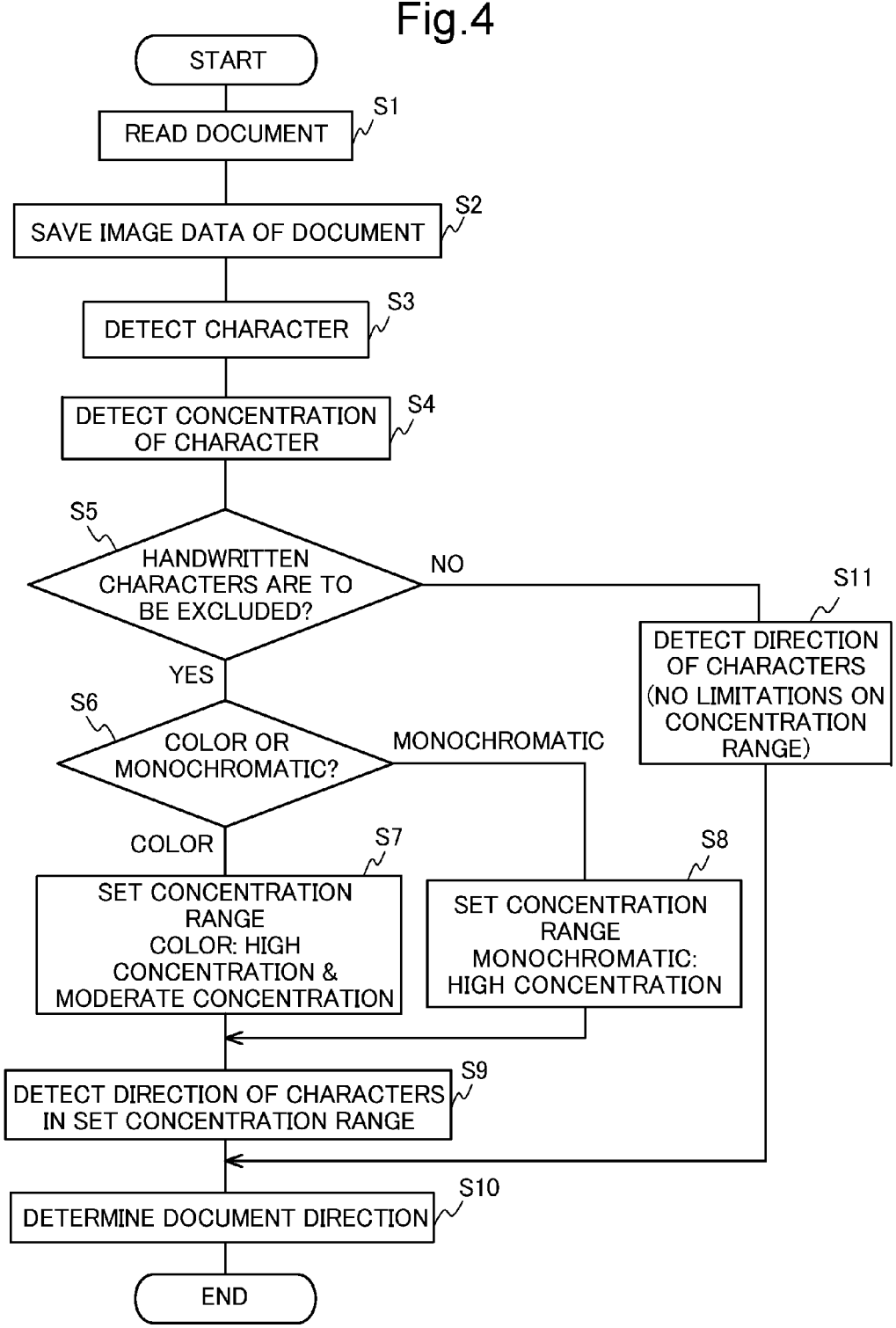
FIG. 4 is a flowchart showing one example of document direction determination processing performed by the image forming apparatus.

Next, document direction determination processing performed by the image forming apparatus 1 will be described. FIG. 4 is a flowchart showing the document direction determination processing performed by the image forming apparatus 1.

Upon operator's inputting of the document reading instruction through operation of the operation section 47, the control section 100 causes the document reading section 5 to read a document (S1). Subsequently, the control section 100 saves, into the image memory 32, image data indicating an image of the document obtained through the reading described above (S2).

Then based on the image data of the document obtained through the reading by the document reading section 5, the character detection section 101 detects each of characters included in the image formed on the document (S3). Further, the character concentration detection section 102 detects concentration of each character detected by the character detection section 101 (S4).

The character direction detection section 103 judges whether an instruction is provided through operation of the aforementioned selection button B1 or selection button B2 (S5). Here, upon judgment by the character direction detection section 103 that the instruction for determining a direction of the document while excluding handwritten characters based on the operation of the selection button B1 has been received (YES in S5), the character direction detection section 103 further judges whether the document image is a color image or a monochromatic image (S6).

Upon judgment by the character direction detection section 103 that the document image is a color image ("color" in S6), the character direction detection section 103 sets, as the specified concentration range R, portions (with high concentration or moderate concentration) other than the regions E2 and E3 as shown in FIG. 3B (S7). That is, the character direction detection section 103 sets high and intermediate concentration ranges as the specified concentration ranges R.

On the other hand, upon judgment that the document image is a monochromatic image ("monochromatic" in S6), the character direction detection section 103 sets, as the specified concentration range R, for example, a portion darker than the concentration C1 illustrated in FIG. 3A (S8).

The character direction detection section 103 detects a direction of the characters which are included in those detected by the character detection section 101 and which have concentration in the specified concentration range R set in S7 or S8 (S9).

Upon judgment in S5 by the character direction detection section 103 based on the operation of the selection button B2 that the instruction for determining a direction of the document without excluding handwritten characters has been received (NO in S5), the direction of the characters detected by the character detection section 101 is detected (S11). That is, the character direction detection section 103 detects the direction of all the characters regardless of the concentration of each character.

Then the document direction determination section 104 determines, as a direction of the image formed on the document, the direction of the characters detected by the character direction detection section 103 in S9 or S11 (S10).

Handwritten characters may be added with a writing material such as a pencil or a ballpoint pen on a printed material on which printed characters (so-called type) formed by, for example, a personal computer (PC) in a known font are printed. In this case, directions of the aforementioned printed characters included in the printed material are basically the same, but the user additionally writes characters in, for example, a marginal region of the printed material in a desired direction in many cases, so that a direction of the handwritten characters is not necessarily the same as that of the printed characters.

An OCR function recognizes characters through checking, for example, by pattern matching between an image indicating the font described above and an image indicating read characters, and the handwritten characters may match the image indicating the font described above and be recognized as printed characters. In this case, a detected direction of the printed characters and a detected direction of the handwritten characters may differ from each other, resulting in a risk of erroneous determination of the direction of the document image.

In a case where a technology of improving accuracy in character recognition described in BACKGROUND is adopted for the purpose of improving accuracy of the OCR, even a color image is converted into a monochromatic image for character recognition, so that an OCR technology suitable for a color image and an OCR technology suitable for a monochromatic image are not used differently from each other.

On the contrary, with the embodiment described above, a direction of an image of even a document including a mixture of printed characters and handwritten characters can accurately be determined, and also accuracy in determination of a direction of a document image which is monochromatic can be improved.

Figure 5:
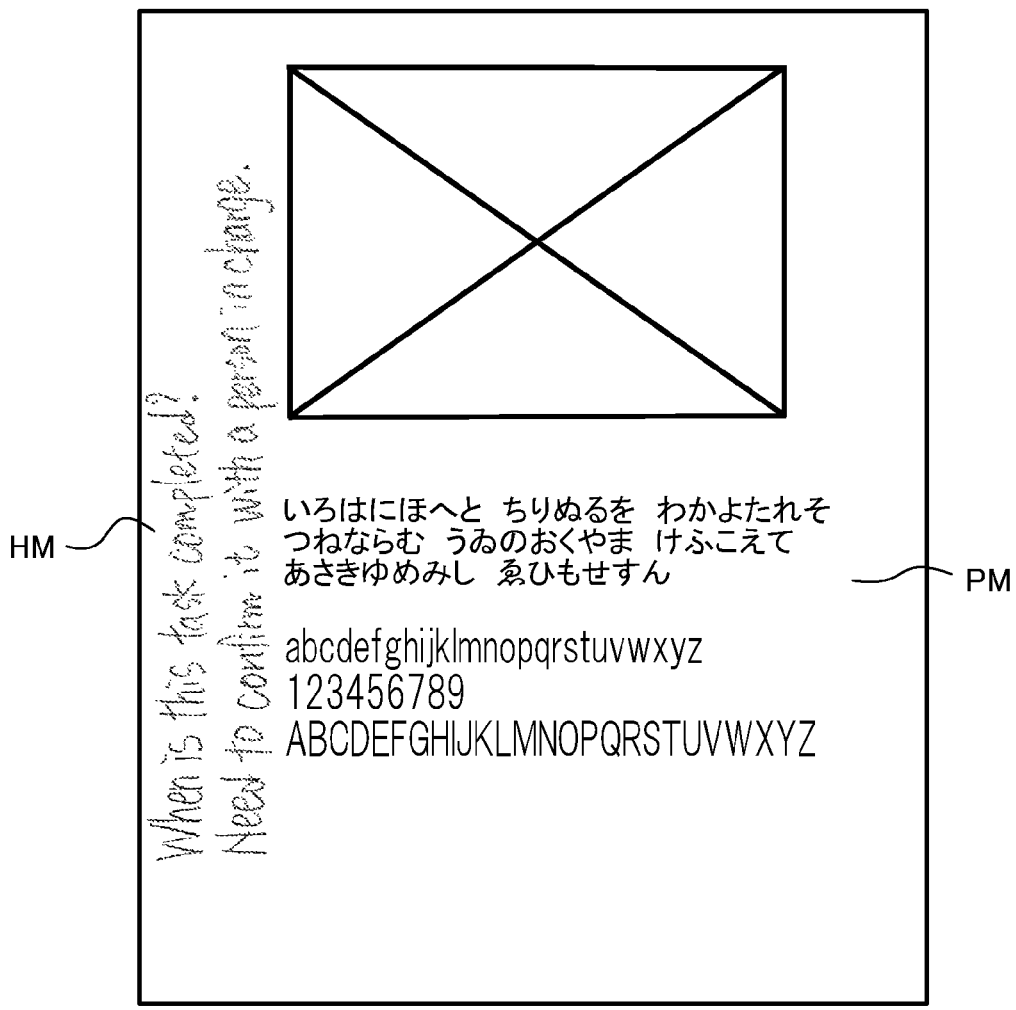
FIG. 5 is a diagram showing one example of a document image.

For example, upon reading of a document D as shown in FIG. 5, determination of a direction of the document without excluding handwritten characters results in determination that the handwritten characters HM in FIG. 5 are oriented leftward and printed characters PM in FIG. 5 are oriented upward. Thus, the document direction is oriented leftward or upward as described above, thus leading to a risk of judgment that the document is oriented leftward even though the direction of the printed characters, which occupy a large portion of print contents, is upward. However, with the embodiment described above, the determination of the document direction while excluding the handwritten characters permits determination of the document direction based on only the direction of the printed characters PM, which therefore permits matching between the direction of the printed characters occupying a large portion of the print contents and the determined document direction.

Handwritten characters written with a pen or the like typically has lower concentration than printed characters. Thus, as a result of excluding characters with low concentration from characters included in an image formed on a document, only printed characters formed in a known font remain. In this embodiment, setting the specified concentration range described above at concentration (concentration higher than that of handwritten characters) used for printed characters formed in a known font makes it possible to detect a direction of the printed characters while excluding the handwritten characters and determine a direction of an image formed on a document based on only the direction of the printed characters. Thus, with this embodiment, even when a document includes a mixture of printed characters and handwritten characters, it is possible to accurately determine, based on a detected character direction for the printed characters, a direction of an image formed on the document as a document direction.

This disclosure is not limited to the configuration of the embodiment described above, and various modifications can be made thereto. For example, in the embodiment described above, the character direction detection section 103 determines, based on the concentration of each character detected by the character concentration detection section 102, whether each character detected by the character detection section 101 is a color image or a monochromatic image, and in accordance with whether each character is a color image or a monochromatic image, uses either of the different specified concentration ranges R used for the respective images. Alternatively, for example, based on the concentration of each character detected by the character concentration detection section 102, the character direction detection section 103 may calculate a concentration histogram for each character included in the document image and based on the calculated concentration histogram, use a most frequently appearing range as the specified concentration range R.

Figure 6:
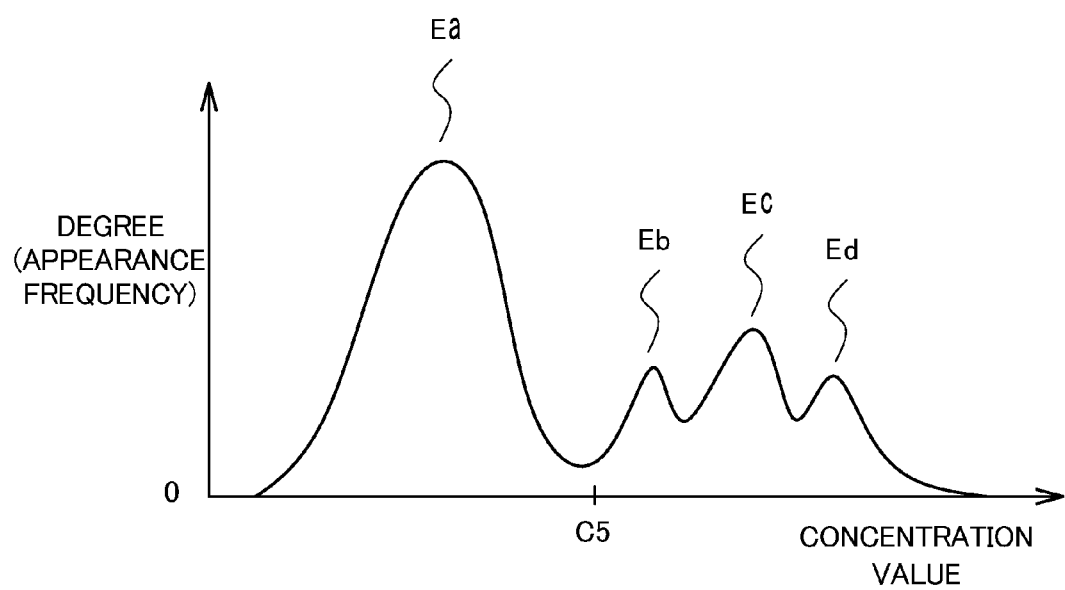
FIG. 6 is a diagram showing a concentration histogram of the document image.

For example, as shown in FIG. 6, in a case where four types of character concentration Ea to Ed which appear with high frequency are present in image data of a document read by the document reading section 5, the character direction detection section 103 sets, as the specified concentration range R, the most frequently appearing region Ec with concentration C5 or more. Note that background of document paper corresponds to the most frequently appearing region Ea in many cases.

As a result, even without performing any particular operation and particular settings on an operator's side, in a case where printed characters occupy a larger portion than handwritten characters in an image formed on a document, a direction of the printed characters can be determined as a document direction, and in a case where the handwritten characters occupy a larger portion than the printed characters in the image described above, a direction of the handwritten characters can be determined as the document direction.

Moreover, in the embodiment described above, the configuration and processing shown by the embodiment described above with reference to FIGS. 1 to 6 form only one embodiment of this disclosure, and this disclosure is not at all limited to the configuration and processing described above.

While the present disclosure has been described in detail with reference to the embodiments thereof, it would be apparent to those skilled in the art the various changes and modifications may be made therein within the scope defined by the appended claims.

What is claimed is:

1. An image reader comprising:
a document reading section reading a document;
a character detection section detecting, based on image data of the document obtained through the reading by the document reading section, characters included in an image formed on the document;
a character concentration detection section detecting concentration of the characters detected by the character detection section;
a character direction detection section detecting a direction of the characters detected by the character detection section, the character direction detection section targeting the characters whose concentration detected by the character concentration detection section is in a specified concentration range to perform the character direction detection; and
a document direction determination section determining, based on the direction of the characters detected by the character direction detection section, a direction of the image formed on the document as a document direction, wherein
the character direction detection section determines, based on the concentration of the characters detected by the character concentration detection section, whether the image on the document is a monochromatic image or a color image, and upon determination that the image on the document is a monochromatic image, the character direction detection section sets the specified concentration range as a concentration range higher than predefined first concentration that indicates a range of concentration to be used for a character printing using a font, and detects a direction of the characters detected by the character detection section only for the characters whose character concentration is in the specified concentration range.

2. The image reader according to claim 1, wherein
based on the concentration of the characters detected by the character concentration detection section, the character direction detection section determines whether the image on the document is a monochromatic image or a color image, and upon determination that the image on the document is a color image, the character direction detection section defines, as the specified concentration range, a concentration range higher than predefined second concentration and a concentration range between third concentration lower than the second concentration and fourth concentration lower than the third concentration.

3. The image reader according to claim 1, further comprising a concentration range setting reception section receiving, from an operator, setting of a value indicating the specified concentration range, wherein
the character direction detection section defines, as the specified concentration range, the value received by the concentration range setting reception section.

4. The image reader according to claim 1, further comprising
an operation section selectively receiving either of a handwritten character exclusion instruction indicating that the document direction is determined while excluding handwritten characters and a handwritten character incorporation instruction indicating that the document direction is determined while not excluding but incorporating the handwritten characters, wherein
upon reception of the handwritten character exclusion instruction by the operation section, the character direction detection section detects the direction of the characters while defining, as the specified concentration range, the concentration range higher than the first concentration, and
upon reception of the handwritten character incorporation instruction by the operation section, the character direction detection section detects the direction of all the characters regardless of whether or not the characters are in the specified concentration range.

5. The image reader according to claim 1, wherein
upon determination that the image on the document is a monochromatic image, in place of processing of defining, as the specified concentration range, the concentration range higher than the predefined first concentration, the character direction detection section performs processing of calculating, based on the concentration of each of the characters detected by the character concentration detection section, a concentration histogram for each character detected by the character detection section, and from the calculated concentration histogram, processing of defining, as the specified concentration range, a most frequently appearing range.

6. An image forming apparatus comprising:
an image reader comprising:
a document reading section reading a document;
a character detection section detecting, based on image data of the document obtained through the reading by the document reading section, characters included in an image formed on the document;
a character concentration detection section detecting concentration of the characters detected by the character detection section;
a character direction detection section detecting a direction of the characters detected by the character detection section, the character direction detection section targeting the characters whose concentration detected by the character concentration detection section is in a preset specified concentration range to perform the character direction detection; and
a document direction determination section determining, based on the direction of the characters detected by the character direction detection section, a direction of the image formed on the document as a document direction, wherein
the character direction detection section, based on the concentration of the characters detected by the character concentration detection section, determines whether the image on the document is a monochromatic image or a color image, and upon determination that the image on the document is a monochromatic image, the character direction detection section sets the specified concentration range as a concentration range higher than predefined first concentration that indicates a range of concentration to be used for a character printing using a font, and detects a direction of the characters detected by the character detection section only for the characters whose character concentration is in the specified concentration range; and an image formation section forming an image on a recording medium.

* * * * *